US012109879B2

(12) United States Patent
Choi (10) Patent No.: US 12,109,879 B2
(45) Date of Patent: Oct. 8, 2024

(54) VEHICLE FLOOR STRUCTURE

(71) Applicants: HYUNDAI MOTOR COMPANY, Seoul (KR); Kia Corporation, Seoul (KR)

(72) Inventor: Ji Ho Choi, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 546 days.

(21) Appl. No.: 17/545,295

(22) Filed: Dec. 8, 2021

(65) Prior Publication Data

US 2023/0016788 A1    Jan. 19, 2023

(30) Foreign Application Priority Data

Jul. 14, 2021    (KR) ........................ 10-2021-0092501

(51) Int. Cl.
| | |
|---|---|
| *B60K 15/07* | (2006.01) |
| *B62D 25/20* | (2006.01) |
| *B60K 1/04* | (2019.01) |
| *B60K 15/03* | (2006.01) |
| *B62D 27/00* | (2006.01) |

(52) U.S. Cl.
CPC ............. *B60K 15/07* (2013.01); *B62D 25/20* (2013.01); *B60K 2001/0438* (2013.01); *B60K 2015/03315* (2013.01); *B62D 27/00* (2013.01)

(58) Field of Classification Search
CPC ................................ B60K 15/07; B62D 25/20
See application file for complete search history.

(56) References Cited

U.S. PATENT DOCUMENTS

| 11,447,005 B2 * | 9/2022 | Sawai ..................... B60K 15/07 |
| 2022/0105799 A1 * | 4/2022 | Bochicchio De Maria ................ B60K 15/07 |
| 2023/0055646 A1 * | 2/2023 | Kemmer .................... F17C 5/06 |

FOREIGN PATENT DOCUMENTS

DE    102022129587 A1 *    5/2024

* cited by examiner

*Primary Examiner* — Kevin Hurley
(74) *Attorney, Agent, or Firm* — MORGAN, LEWIS & BOCKIUS LLP (57) ABSTRACT

A vehicle floor structure may include a floor disposed on a bottom portion of a vehicle body; a plurality of tank mounting members attached to a bottom surface of the floor; and a plurality of hydrogen tanks mounted on the plurality of tank mounting members, wherein each tank mounting member is aligned to extend in a longitudinal direction of the vehicle, the plurality of tank mounting members is spaced from each other in a width direction of the vehicle, each tank mounting member has a plurality of lower recessed portions provided in a lower portion thereof, and at least predetermined upper portions of the hydrogen tanks are received in the lower recessed portions of the tank mounting members, respectively.

20 Claims, 8 Drawing Sheets

VEHICLE FLOOR STRUCTURE

CROSS-REFERENCE TO RELATED APPLICATION

The present application claims priority to Korean Patent Application No. 10-2021-0092501, filed on Jul. 14, 2021, the, the entire contents of which is incorporated herein for all purposes by this reference.

BACKGROUND OF THE INVENTION

Field of the Invention

The present invention relates to a vehicle floor structure, and more particularly, to a vehicle floor structure in which a hydrogen tank and a battery are disposed under a center floor.

Description of Related Art

In recent years, as the perception of environmental crisis and depletion of oil resources has increased, research and development of eco-friendly electric vehicles have actively been conducted. Electric vehicles include plug-in hybrid electric vehicles (PHEVs), battery electric vehicles (BEVs), fuel cell electric vehicles (FCEVs), etc.

FCEV includes a fuel cell stack generating electricity using hydrogen, a hydrogen tank storing hydrogen, and a battery pack storing electrical energy generated by regenerative braking.

FCEV inevitably requires a large-capacity hydrogen tank to increase its all electric range (AER). Considering the internal pressure of the hydrogen tank, the shape of the hydrogen tank is limited to a cylindrical shape, which leads to difficulties in securing its capacity.

According to the related art, a recessed portion partially matching the cylindrical shape of the hydrogen tank is formed in a floor of the vehicle along a width direction of the vehicle, and the hydrogen tank is mounted in the recessed portion of the floor through a tank mounting member, and accordingly the hydrogen tank is arranged along the width direction of the vehicle.

According to another related art, a tunnel having a relatively large internal volume is provided at the center portion of the floor in a longitudinal direction of the vehicle, and the hydrogen tank is mounted within the tunnel, and accordingly the hydrogen tank is arranged in the longitudinal direction of the vehicle.

In the related art FCEV, as the cylindrical hydrogen tank is mounted on the floor, it is practically difficult to make the floor flat. Since it is very difficult to make the flat floor, it is practically difficult to mount long slide seat rails for the movement of a seat on the floor. For the present reason, FCEV is difficult to have a body structure requiring such a flat floor and long slide seat rails, like a body structure of a multi-purpose vehicle (MPV).

When the hydrogen tank is mounted on the flat floor, the capacity of the hydrogen tank is inevitably reduced due to the limitation of ground clearance, and thus the AER of FCEV is reduced and the driving performance thereof is lowered.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle floor structure allowing a hydrogen tank to be securely mounted on a flat floor, ensuring a sufficient capacity of the hydrogen tank, and improving stiffness of a vehicle body.

According to various aspects of the present invention, a vehicle floor structure may include: a floor disposed on a bottom portion of a vehicle body; a plurality of tank mounting members attached to a bottom surface of the floor; and a plurality of hydrogen tanks mounted on the plurality of tank mounting members. Each tank mounting member may extend in a longitudinal direction of the vehicle, the plurality of tank mounting members may be spaced from each other in a width direction of the vehicle, each tank mounting member may have a plurality of lower recessed portions provided in a lower portion thereof, and at least predetermined upper portions of the hydrogen tanks may be received in the lower recessed portions of the tank mounting members, respectively.

As the tank mounting members attached to the bottom surface of the floor receive at least some external portions of the hydrogen tanks, the hydrogen tanks may be stably mounted under the floor, which allows the vehicle floor structure to be designed flat.

Each hydrogen tank may have a cylindrical shape having a predetermined radius, and each lower recessed portion may have an arced shape having a same radius as a radius of each hydrogen tank.

Since the radius of the hydrogen tank is the same as that of the lower recessed portion, the hydrogen tanks may be more tightly attached to the tank mounting members, and thus the mountabilty of the hydrogen tanks may be significantly improved.

Each hydrogen tank may extend in the width direction of the vehicle. That is, a longitudinal axis of the hydrogen tank may be parallel to a width axis of the vehicle. The plurality of hydrogen tanks may be spaced from each other in the longitudinal direction of the vehicle.

As each of the hydrogen tanks extends in the width direction of the vehicle, and the plurality of hydrogen tanks is spaced from each other in the longitudinal direction of the vehicle, the hydrogen tanks having relatively large capacities may be efficiently arranged under the floor.

The plurality of hydrogen tanks may be mounted on the plurality of tank mounting members through a plurality of mounting bands, and the plurality of mounting bands may be aligned with the plurality of tank mounting members. Each mounting band may have a plurality of recesses, and at least predetermined lower portions of the hydrogen tanks may be accommodated in the recesses, respectively.

The plurality of hydrogen tanks may be securely mounted to the plurality of tank mounting members by the plurality of mounting bands, and thus the plurality of hydrogen tanks may be stably held under the floor.

The vehicle floor structure may further include a frame attached to the bottom surface of the floor. The frame may include a pair of side members disposed on first and second edge portions of the floor, respectively, and a plurality of crossmembers extending between the pair of side members. The plurality of tank mounting members may be fixed to the plurality of crossmembers.

As the plurality of tank mounting members is joined to the crossmembers of the frame, mounting stiffness of the hydrogen tanks may be improved.

Each tank mounting member may have a plurality of upper recessed portions provided in an upper portion thereof, and the plurality of upper recessed portions may receive the plurality of crossmembers, respectively.

As the plurality of crossmembers are received in the upper recessed portions of the tank mounting members, the tank mounting members may be relatively close to the floor, minimizing a space between the plurality of hydrogen tanks and the floor, and thus ensuring sufficient ground clearance of the vehicle.

The plurality of crossmembers may include: a front crossmember to which a front end portion of each of the tank mounting members is fixed; a rear crossmember to which a rear end portion of each of the tank mounting members is fixed; and a plurality of middle crossmembers disposed between the front crossmember and the rear crossmember.

A front end portion of each of the mounting bands may be fixed to the front crossmember together with the front end portion of each of the tank mounting members via a first front bolt, and the front crossmember may be fixed to the bottom surface of the floor via a second front bolt.

As the front end portion of each mounting band the front end portion of each tank mounting member are fixed together to the front crossmember, and the front crossmember is fixed to the bottom surface of the floor, the plurality of tank mounting members may securely hold the hydrogen tanks.

A longitudinal axis of the first front bolt may be aligned with a longitudinal axis of the second front bolt in a height direction of the vehicle.

Thus, the front end portion of each mounting band, the front end portion of each tank mounting member, and the front crossmember may be securely fixed to the floor.

According to various exemplary embodiments of the present invention, the front crossmember may have a cavity defined therein, the front crossmember may include a first front nut and a second front nut provided in the cavity thereof, the first front nut may be positioned below the second front nut, the first front bolt may be screwed into the first front nut, and the second front bolt may be screwed into the second front nut.

As the first front nut and the second front nut are provided in the front crossmember, the engagement of the first front bolt and the second front bolt may be facilitated.

According to another exemplary embodiment of the present invention, the front crossmember may have a cavity defined therein, the front crossmember may include a front nut provided in the cavity thereof, the first front bolt may be screwed into lower internal threads of the front nut, and the second front bolt may be screwed into upper internal threads of the front nut.

As the first front bolt and the second front bolt are screwed together into the front nut, the engagement of the first front bolt and the second front bolt may be facilitated.

A rear end portion of each of the mounting bands may be fixed to the rear crossmember together with the rear end portion of each of the tank mounting members via a first rear bolt, and the rear crossmember may be fixed to the bottom surface of the floor via a second rear bolt.

As the rear end portion of each mounting band the rear end portion of each tank mounting member are fixed together to the rear crossmember, and the rear crossmember is fixed to the bottom surface of the floor, the plurality of tank mounting members may securely hold the hydrogen tanks.

A longitudinal axis of the first rear bolt may be aligned with a longitudinal axis of the second rear bolt in a height direction of the vehicle.

Thus, the rear end portion of each mounting band, the rear end portion of each tank mounting member, and the rear crossmember may be securely fixed to the floor.

According to various exemplary embodiments of the present invention, the rear crossmember may have a cavity defined therein, the rear crossmember may include a first rear nut and a second rear nut provided in the cavity thereof, the first rear nut may be positioned below the second rear nut, the first rear bolt may be screwed into the first rear nut, and the second rear bolt may be screwed into the second rear nut.

As the first rear nut and the second rear nut are provided in the rear crossmember, the engagement of the first rear bolt and the second rear bolt may be facilitated.

According to another exemplary embodiment of the present invention, the rear crossmember may have a cavity defined therein, the rear crossmember may include a rear nut provided in the cavity thereof, the first rear bolt may be screwed into lower internal threads of the rear nut, and the second rear bolt may be screwed into upper internal threads of the rear nut.

As the first rear bolt and the second rear bolt are screwed together into the rear nut, the engagement of the first rear bolt and the second rear bolt may be facilitated.

Middle portions of the tank mounting members may be fixed to the corresponding middle crossmembers through a plurality of first middle bolts.

As the middle portions of the tank mounting members are fixed to the corresponding middle crossmembers through the plurality of first middle bolts, the plurality of tank mounting members may securely hold the hydrogen tanks.

The vehicle floor structure may further include a plurality of center slide rails mounted on a top surface of the floor. Each center slide rail may extend in the longitudinal direction of the vehicle, a longitudinal axis of each tank mounting member may be aligned with a longitudinal axis of each center slide rail, and the center slide rails may be fixed to the floor together with the tank mounting members through a plurality of second middle bolts.

As the tank mounting members are fixed to the floor together with the corresponding center slide rails, mounting stiffness of the center slide rails and the tank mounting members may be improved.

A longitudinal axis of each first middle bolt may be aligned with a longitudinal axis of the corresponding second middle bolt in a height direction of the vehicle.

Thus, the center slide rails, the middle portions of the tank mounting members, and the middle crossmembers may be securely fixed to the floor.

According to various exemplary embodiments of the present invention, each middle crossmember may have a cavity defined therein, the middle crossmember may include a first middle nut and a second middle nut provided in the cavity thereof, the first middle nut may be positioned below the second middle nut, the first middle bolt may be screwed into the first middle nut, and the second middle bolt may be screwed into the second middle nut.

As the first middle nut and the second middle nut are provided in the middle crossmember, the engagement of the first middle bolt and the second middle bolt may be facilitated.

According to another exemplary embodiment of the present invention, each middle crossmember may have a cavity defined therein, the middle crossmember may include a middle nut provided in the cavity thereof, the first middle bolt may be screwed into lower internal threads of the middle nut, and the second middle bolt may be screwed into upper internal threads of the middle nut.

As the first middle bolt and the second middle bolt are screwed together into the middle nut, the engagement of the first middle bolt and the second middle bolt may be facilitated.

The plurality of center slide rails may be fixed to the floor together with the plurality of tank mounting members via a plurality of upper bolts, each of the tank mounting members may include a plurality of upper nuts embedded therein, and the plurality of upper bolts may be screwed into the plurality of upper nuts.

As the plurality of upper nuts are embedded in each tank mounting member, the engagement of the plurality of upper bolts may be facilitated.

The vehicle floor structure may further include a plurality of reinforcing crossmembers extending between the plurality of tank mounting members. A longitudinal axis of each reinforcing crossmember may be parallel to a longitudinal axis of each hydrogen tank.

As the plurality of reinforcing crossmembers connect the plurality of tank mounting members in the width direction of the vehicle, stiffness of the plurality of tank mounting members may be increased.

The plurality of reinforcing crossmembers may be fixed to the floor together with the plurality of tank mounting members. Thus, the plurality of hydrogen tanks may be more securely supported to the floor.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, various exemplary embodiments of the present invention will be described in detail with reference to the accompanying drawings. In the drawings, the same reference numerals will be used throughout to designate the same or equivalent elements. Furthermore, a detailed description of well-known techniques associated with the present invention will be ruled out in order not to unnecessarily obscure the gist of the present invention.

Terms such as first, second, A, B, (a), and (b) may be used to describe the elements in exemplary embodiments of the present invention. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which various exemplary embodiments of the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
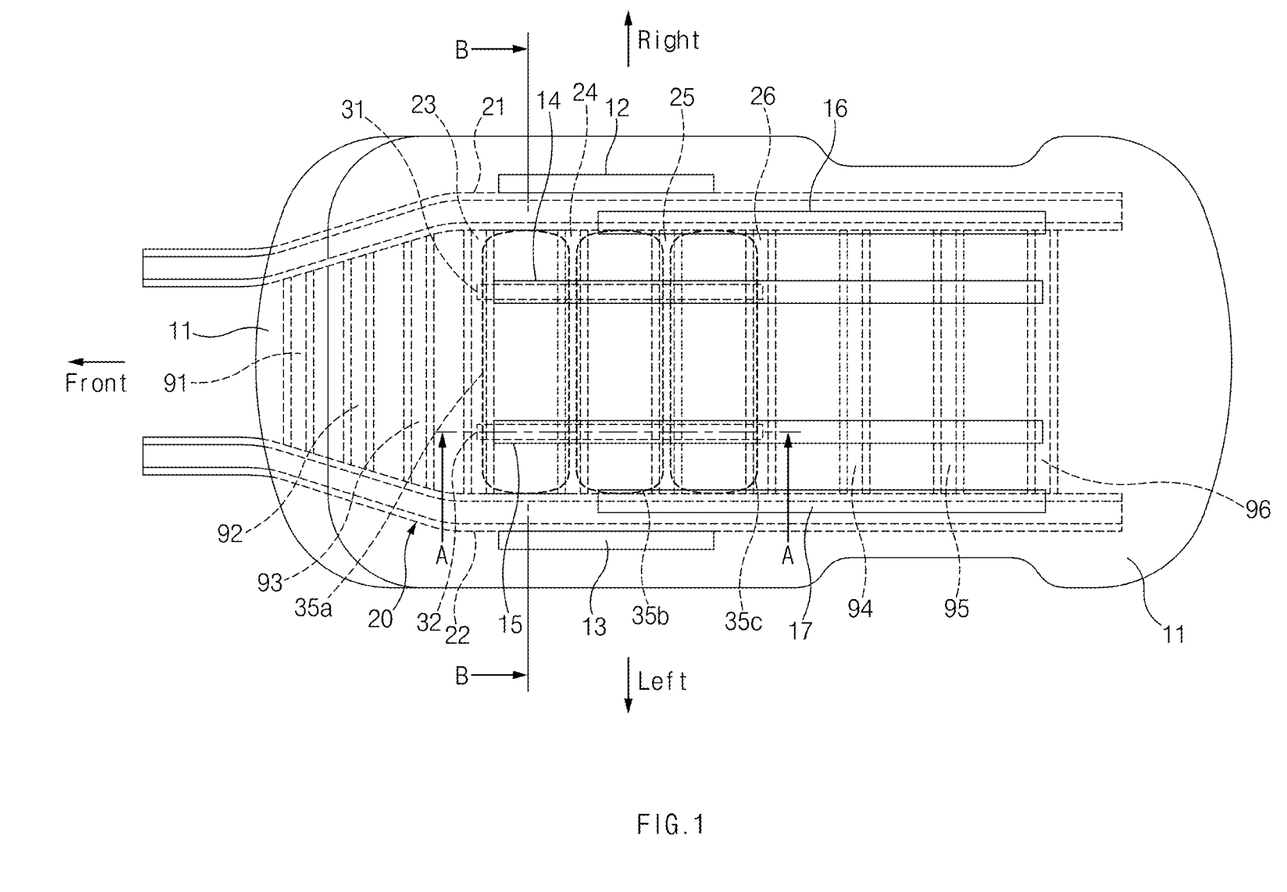
FIG. 1 illustrates a plan view of a vehicle floor structure according to various exemplary embodiments of the present invention.
Figure 2:
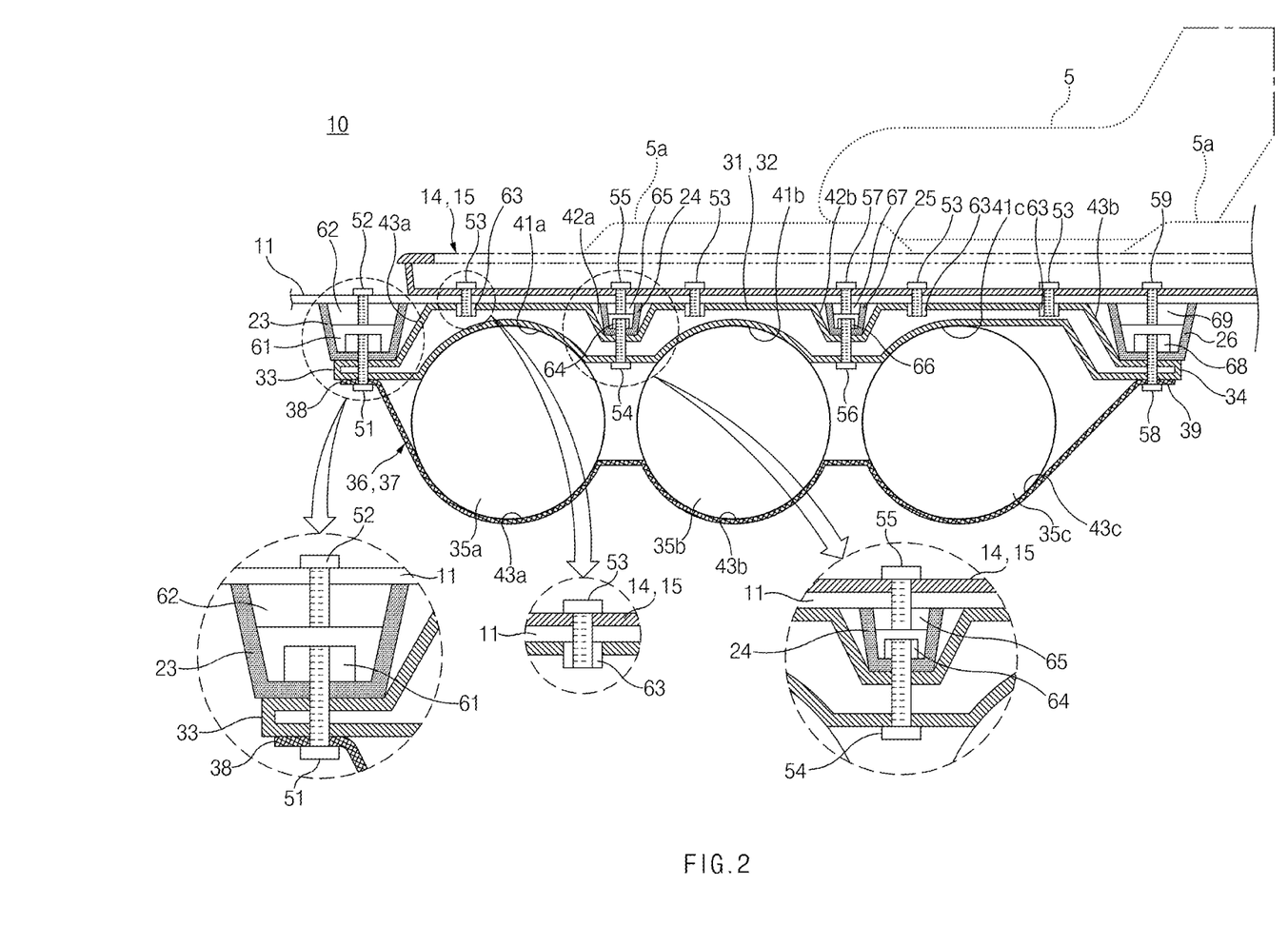
FIG. 2 illustrates a cross-sectional view, taken along line A-A of FIG. 1.

Referring to FIG. 1 and FIG. 2, a vehicle floor structure 10 according to various exemplary embodiments of the present invention may include a floor 11 disposed on the bottom portion of a vehicle body, and a frame 20 attached to a bottom surface of the floor 11.

The floor 11 may be flat through the entirety of the bottom portion of the vehicle body, and a plurality of seat slide rails 12, 13, 14, 15, 16, and 17 may be mounted on a top surface of the floor 11. The plurality of seat slide rails 12, 13, 14, 15, 16, and 17 may be configured to guide the movement of vehicle seats, and the positions of the vehicle seats may be adjusted. Each of the seat slide rails 12, 13, 14, 15, 16, and 17 may extend in a longitudinal direction of the vehicle. The plurality of seat slide rails 12, 13, 14, 15, 16, and 17 may include two side slide rails 12 and 13, two center slide rails 14 and 15, and two middle slide rails 16 and 17. A left side slide rail 12 may be adjacent to a left edge portion of the floor 11, and a right side slide rail 13 may be adjacent to a right edge portion of the floor 11. A left center slide rail 14 may be adjacent to the left of a central longitudinal axis of the floor 11, and a right center slide rail 15 may be adjacent to the right of the central longitudinal axis of the floor 11. A left middle slide rail 16 may be located between the left side slide rail 12 and the left center slide rail 14, and a right middle slide rail 17 may be located between the right side slide rail 13 and the right center slide rail 15. The center slide rails 14 and 15 may be longer than the middle slide rails 16 and 17, and the middle slide rails 16 and 17 may be longer than the side slide rails 12 and 13. Furthermore, a front end portion of each of the side slide rails 12 and 13 may be closer to the front of the vehicle than a front end portion of each of the middle slide rails 16 and 17. Sliders 5a fixed to each vehicle seat 5 may move along the plurality of seat slide rails 12, 13, 14, 15, 16, and 17.

The frame 20 may be attached to the bottom surface of the floor 11 to support the floor 11. The frame 20 may include a pair of side members 21 and 22 extending along both edge portions of the floor 11, and a plurality of crossmembers 23, 24, 25, and 26 extending between the pair of side members 21 and 22.

Each of the side members 21 and 22 may extend in the longitudinal direction of the vehicle, and each of the crossmembers 23, 24, 25, and 26 may extend in a width direction of the vehicle. Tank mounting members 31 and 32 to be described below may be connected to the plurality of crossmembers 23, 24, 25, and 26. A plurality of reinforcing crossmembers 91, 92, 93, 94, 95, and 96 may be located in front of and behind the plurality of crossmembers 23, 24, 25, and 26, whereby the pair of side members 21 and 22 may be more securely connected to each other so that stiffness of the vehicle body may be increased.

Referring to FIG. 1, the vehicle floor structure 10 according to various exemplary embodiments of the present invention may include the plurality of tank mounting members 31 and 32 disposed under the floor 11, and a plurality of hydrogen tanks 35a, 35b, and 35c mounted on the plurality of tank mounting members 31 and 32.

Referring to FIG. 1, the plurality of tank mounting members 31 and 32 may be spaced from each other in the width direction of the vehicle. Each of the tank mounting members 31 and 32 may be joined to the plurality of crossmembers 23, 24, 25, and 26. Referring to FIG. 2, each of the tank mounting members 31 and 32 may extend in the longitudinal direction of the vehicle.

Referring to FIG. 1, each of the hydrogen tanks 35a, 35b, and 35c may extend in the width direction of the vehicle. That is, a longitudinal axis of each of the hydrogen tanks 35a, 35b, and 35c may be parallel to a width axis of the vehicle. The plurality of hydrogen tanks 35a, 35b, and 35c may be spaced from each other in the longitudinal direction of the vehicle. As each of the hydrogen tanks 35a, 35b, and 35c extends in the width direction of the vehicle, and the plurality of hydrogen tanks 35a, 35b, and 35c are spaced from each other in the longitudinal direction of the vehicle, the hydrogen tanks 35a, 35b, and 35c having relatively large capacities may be efficiently arranged under the floor 11.

The plurality of crossmembers 23, 24, 25, and 26 may include a front crossmember 23 connected to a front end portion 33 of each of the tank mounting members 31 and 32, a rear crossmember 26 connected to a rear end portion 34 of each of the tank mounting members 31 and 32, and a plurality of middle crossmembers 24 and 25 disposed between the front crossmember 23 and the rear crossmember 26.

Referring to FIG. 2, each of the tank mounting members 31 and 32 may have a plurality of upper recessed portions 43a, 42a, 42b, and 43b provided in an upper portion thereof. Each of the upper recessed portions 43a, 42a, 42b, and 43b may be recessed from a top surface of each of the tank mounting members 31 and 32 toward a bottom surface thereof. The plurality of upper recessed portions 43a, 42a, 42b, and 43b may include a front upper recessed portion 43a in which the front crossmember 23 is received, a rear upper recessed portion 43b in which the rear crossmember 26 is received, and a plurality of middle upper recessed portions 42a and 42b in which the plurality of middle crossmembers 24 and 25 are received, respectively. The front crossmember 23 may be partially received in the front upper recessed portion 43a, and the rear crossmember 26 may be partially received in the rear upper recessed portion 43b. The middle crossmembers 24 and 25 may be entirely received in the middle upper recessed portions 42a and 42b, respectively. As the upper recessed portions 43a, 42a, 42b, and 43b of the tank mounting members 31 and 32 receive the plurality of crossmembers 23, 24, 25, and 26, the tank mounting members 31 and 32 may be relatively close to the floor 11, minimizing a space between the plurality of hydrogen tanks and the floor, and thus ensuring sufficient ground clearance of the vehicle.

Figure 5:
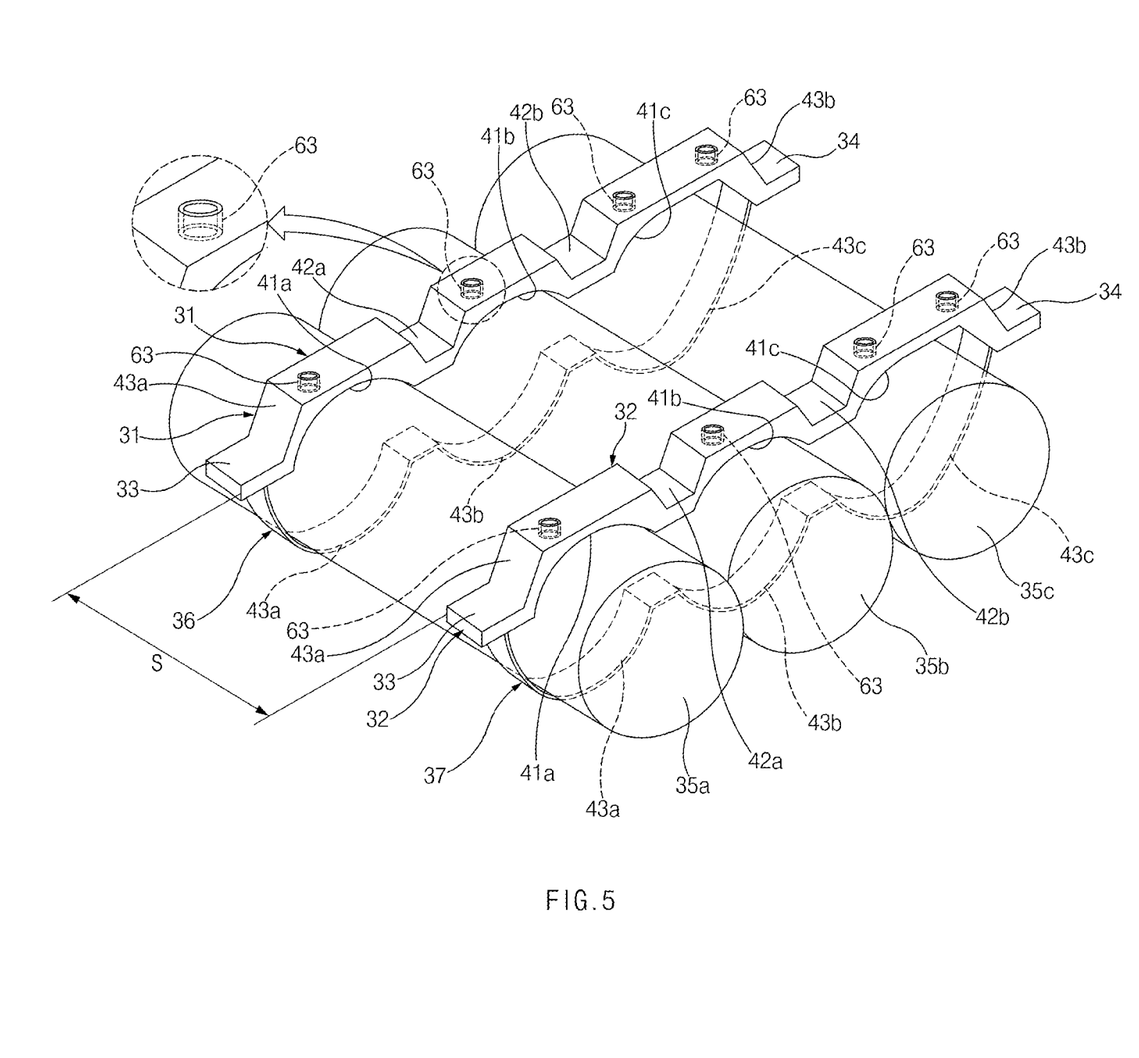
FIG. 5 illustrates a perspective view of a vehicle floor structure according to various exemplary embodiments of the present invention, in which a plurality of hydrogen tanks are mounted between two tank mounting members and two mounting bands.

Referring to FIGS. 2 and 5, each of the tank mounting members 31 and 32 may have a plurality of lower recessed portions 41a, 41b, and 41c provided in a lower portion thereof. Each of the lower recessed portions 41a, 41b, and 41c may be recessed from the bottom surface of each of the tank mounting members 31 and 32 toward the top surface thereof. The lower recessed portions 41a, 41b, and 41c may receive at least some portions of the hydrogen tanks 35a, 35b, and 35c, respectively. At least some upper portions of the hydrogen tanks 35a, 35b, and 35c may be received in the lower recessed portions 41a, 41b, and 41c, respectively.

Each of the hydrogen tanks 35a, 35b, and 35c may have a cylindrical shape having a predetermined radius, and each of the lower recessed portions 41a, 41b, and 41c may have an arced shape having the same radius as that of each of the hydrogen tanks 35a, 35b, and 35c. Since the radius of each of the hydrogen tanks 35a, 35b, and 35c is the same as that of each of the lower recessed portions 41a, 41b, and 41c, the hydrogen tanks 35a, 35b, and 35c may be tightly attached to the tank mounting members 31 and 32, and thus the mountabilty of the plurality of hydrogen tanks 35a, 35b, and 35c may be significantly improved.

Referring to FIG. 2, the plurality of hydrogen tanks 35a, 35b, and 35c may be mounted to the plurality of tank mounting members 31 and 32 through a plurality of mounting bands 36 and 37. Each of the mounting bands 36 and 37 may extend in the longitudinal direction of the vehicle. The mounting bands 36 and 37 may be aligned with the tank mounting members 31 and 32 in the longitudinal direction of the vehicle, respectively. Referring to FIG. 5, a longitudinal axis of each of the mounting bands 36 and 37 may be aligned with the longitudinal axis of each of the tank mounting members 31 and 32. Each of the mounting bands 36 and 37 may have a plurality of recesses 43a, 43b, and 43c, and at least some lower portions of the hydrogen tanks 35a, 35b, and 35c may be accommodated in the recesses 43a, 43b, and 43c, respectively. The plurality of hydrogen tanks 35a, 35b, and 35c may be securely mounted to the plurality of tank mounting members 31 and 32 by the plurality of mounting bands 36 and 37, and thus the plurality of hydrogen tanks 35a, 35b, and 35c may be stably held under the floor 11.

Referring to FIG. 2, a front end portion 38 of each of the mounting bands 36 and 37 may be fixed to the front crossmember 23 together with the front end portion 33 of each of the tank mounting members 31 and 32 via a first front bolt 51. The front crossmember 23 may have a cavity defined therein. The front crossmember 23 may include a first front nut 61 provided in the cavity thereof, and the first front nut 61 may be fixed to the bottom portion of the front crossmember 23 by welding and/or the like. The first front bolt 51 may be screwed into the first front nut 61 through the front end portion 38 of each of the mounting bands 36 and 37, the front end portion 33 of each of the tank mounting members 31 and 32, and the bottom portion of the front crossmember 23 so that the front end portions 38 of the mounting bands 36 and 37 and the front end portions 33 of the tank mounting members 31 and 32 may be fixed together to the front crossmember 23.

Referring to FIG. 2, the front crossmember 23 may be fixed to the bottom surface of the floor 11 via a second front bolt 52. The front crossmember 23 may include a second front nut 62 provided in the cavity thereof, and the second front nut 62 may be fixed to an internal wall of the front crossmember 23 by welding and/or the like. The second front nut 62 may be positioned above the first front nut 61 in the cavity of the front crossmember 23. The second front bolt 52 may be screwed into the second front nut 62 of the front crossmember 23 through the floor 11 so that the front crossmember 23 may be fixed to the bottom surface of the floor 11.

According to various exemplary embodiments of the present invention, a longitudinal axis of the first front bolt 51 may be aligned with a longitudinal axis of the second front bolt 52 in a vertical direction (a height direction of the vehicle), and a longitudinal axis of the first front nut 61 may be aligned with a longitudinal axis of the second front nut 62 in the vertical direction (the height direction of the vehicle).

Referring to FIG. 2, a rear end portion 39 of each of the mounting bands 36 and 37 may be fixed to the rear crossmember 26 together with the rear end portion 34 of each of the tank mounting members 31 and 32 via a first rear bolt 58. The rear crossmember 26 may have a cavity defined therein. The rear crossmember 26 may include a first rear nut 68 provided in the cavity thereof, and the first rear nut 68 may be fixed to the bottom portion of the rear crossmember 26 by welding and/or the like. The first rear bolt 58 may be screwed into the first rear nut 68 through the rear end portion 39 of each of the mounting bands 36 and 37, the rear end portion 34 of each of the tank mounting members 31 and 32, and the bottom portion of the rear crossmember 26 so that the rear end portions 39 of the mounting bands 36 and 37 and the rear end portions 34 of the tank mounting members 31 and 32 may be fixed together to the rear crossmember 26.

Referring to FIG. 2, the rear crossmember 26 may be fixed to the bottom surface of the floor 11 via a second rear bolt 59. The rear crossmember 26 may include a second rear nut 69 provided in the cavity thereof, and the second rear nut 69 may be fixed to an internal wall of the rear crossmember 26 by welding and/or the like. The second rear nut 69 may be positioned above the first rear nut 68 in the cavity of the rear crossmember 26. The second rear bolt 59 may be screwed into the second rear nut 69 of the rear crossmember 26 through the floor 11 so that the rear crossmember 26 may be fixed to the bottom surface of the floor 11.

According to various exemplary embodiments of the present invention, a longitudinal axis of the first rear bolt 58 may be aligned with a longitudinal axis of the second rear bolt 59 in the vertical direction (the height direction of the vehicle), and a longitudinal axis of the first rear nut 68 may be aligned with a longitudinal axis of the second rear nut 69 in the vertical direction (the height direction of the vehicle).

Referring to FIG. 2, middle portions of the tank mounting members 31 and 32 may be fixed to the corresponding middle crossmembers 24 and 25 through a plurality of first middle bolts 54 and 56, respectively. The middle portions of the tank mounting members 31 and 32 may be aligned with the plurality of middle upper recessed portions 42a and 42b, respectively, and be positioned between the adjacent lower recessed portions 41a, 41b, and 41c. Each of the middle crossmembers 24 and 25 may have a cavity defined therein. The middle crossmembers 24 and 25 may include first middle nuts 64 and 66 provided in the cavities thereof, respectively. The first middle nuts 64 and 66 may be fixed to the bottom portion of the corresponding middle crossmembers 24 and 25 by welding and/or the like. The middle upper recessed portions 42a and 42b of the tank mounting members 31 and 32 may receive the corresponding middle crossmembers 24 and 25, respectively, and the first middle bolts 54 and 56 may be screwed into the corresponding first middle nuts 64 and 66 through the bottom portion of the middle portions of the tank mounting members 31 and 32 so that the middle portions of the tank mounting members 31 and 32 may be fixed to the corresponding middle crossmembers 24 and 25.

Referring to FIG. 2, some seat slide rails 14 and 15 of the plurality of seat slide rails 12, 13, 14, 15, 16, and 17 may be fixed to the floor 11 together with the plurality of middle crossmembers 24 and 25 through a plurality of second middle bolts 55 and 57. The two center slide rails 14 and 15 may be fixed to the floor 11 together with the plurality of middle crossmembers 24 and 25 through the plurality of second middle bolts 55 and 57. The middle crossmembers 24 and 25 may include second middle nuts 65 and 67 provided in the cavities thereof, respectively. The second middle nuts 65 and 67 may be fixed to internal walls of the corresponding middle crossmembers 24 and 25, respectively. The middle upper recessed portions 42a and 42b of the tank mounting members 31 and 32 may receive the corresponding middle crossmembers 24 and 25, respectively, and the second middle bolts 55 and 57 may be screwed into the corresponding second middle nuts 65 and 67 through the center slide rails 14 and 15 and the floor 11 so that the center slide rails 14 and 15 may be fixed to the floor 11 together with the plurality of middle crossmembers 24 and 25. As the middle crossmembers 24 and 25 are attached to the bottom surface of the floor 11, and the center slide rails 14 and 15 are attached to the top surface of the floor 11, the center slide rails 14 and 15 may face the middle crossmembers 24 and 25 with the floor 11 interposed therebetween, and thus mounting stiffness of the center slide rails 14 and 15 and the middle crossmembers 24 and 25 may be improved.

According to various exemplary embodiments of the present invention, a longitudinal axis of each of the first middle bolts 54 and 56 may be aligned with a longitudinal axis of each of the corresponding second middle bolts 55 and 57 in the vertical direction (the height direction of the vehicle), and a longitudinal axis of each of the second middle nuts 64 and 66 may be aligned with a longitudinal axis of each of the corresponding second middle nuts 65 and 67 in the vertical direction (the height direction of the vehicle).

Figure 4:
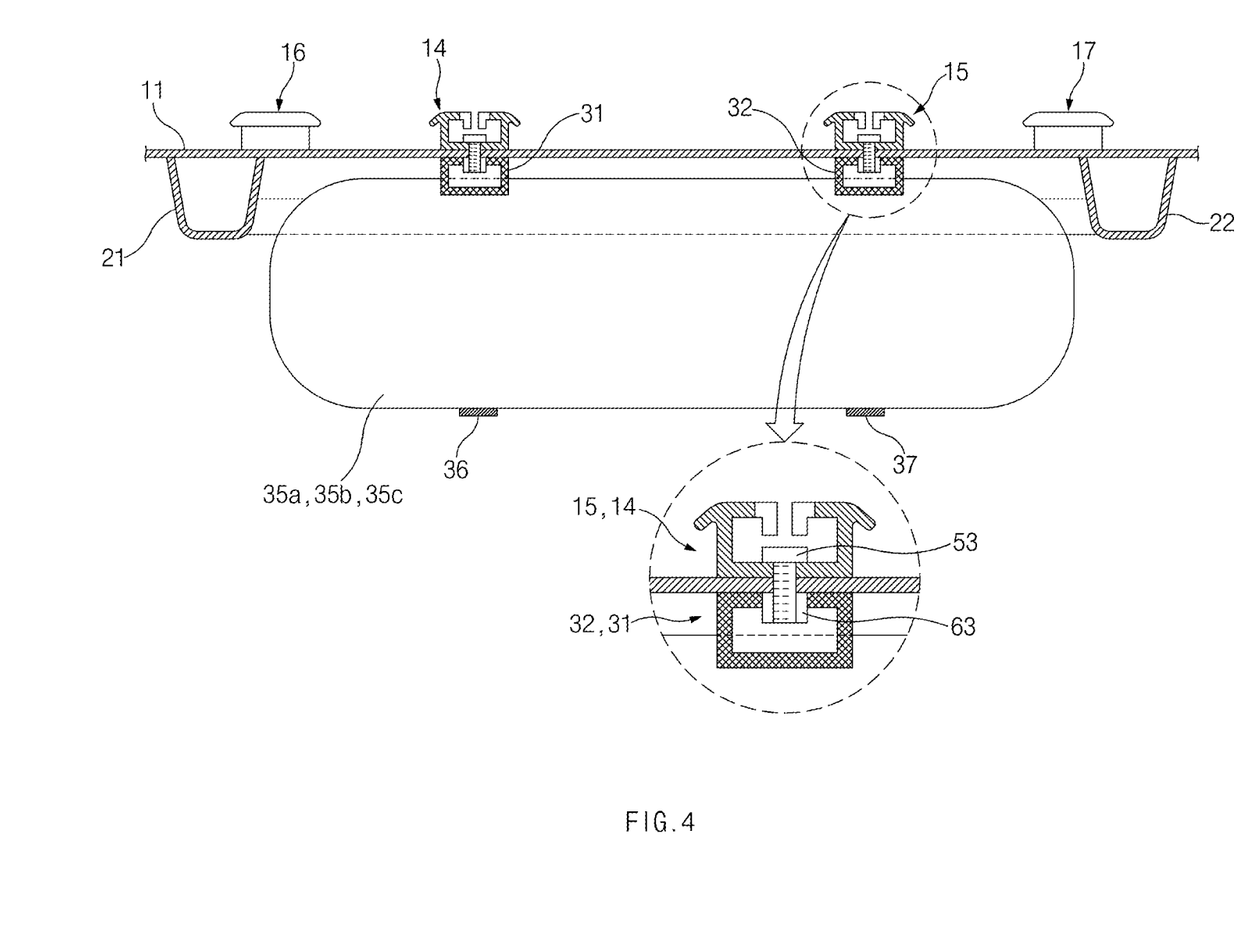
FIG. 4 illustrates a cross-sectional view, taken along line B-B of FIG. 1.

Referring to FIG. 5, the plurality of tank mounting members 31 and 32 may be spaced from each other in the width direction of the vehicle with a predetermined space S therebetween. Referring to FIG. 4, the space S between the plurality of tank mounting members 31 and 32 may correspond to that between the center slide rails 14 and 15. Thus, the longitudinal axis of each of the tank mounting members 31 and 32 may be aligned with a longitudinal axis of each of the center slide rails 14 and 15.

Referring to FIGS. 2 and 4, the two center slide rails 14 and 15 may be fixed to the floor 11 together with the two tank mounting members 31 and 32 through a plurality of upper bolts 53. Referring to FIGS. 2, 4, and 5, each of the tank mounting members 31 and 32 may have a plurality of upper nuts 63, and the plurality of upper nuts 63 may be fixedly embedded in each of the tank mounting members 31 and 32. A top surface of each upper nut 63 may be aligned with the top surface of each of the tank mounting members 31 and 32 so that the top surface of the upper nut 63 may be flush with the top surface of each of the tank mounting members 31 and 32. The upper bolts 53 may be screwed into the corresponding upper nuts 63 through the center slide rails 14 and 15 and the floor 11, respectively, so that the two center slide rails 14 and 15 may be fixed to the floor 11 together with the two tank mounting members 31 and 32. As the tank mounting members 31 and 32 are attached to the bottom surface of the floor 11, and the center slide rails 14 and 15 are attached to the top surface of the floor 11, the center slide rails 14 and 15 may face the tank mounting members 31 and 32 with the floor 11 interposed therebetween, and thus mounting stiffness of the center slide rails 14 and 15 and the tank mounting members 31 and 32 may be improved.

Figure 3:
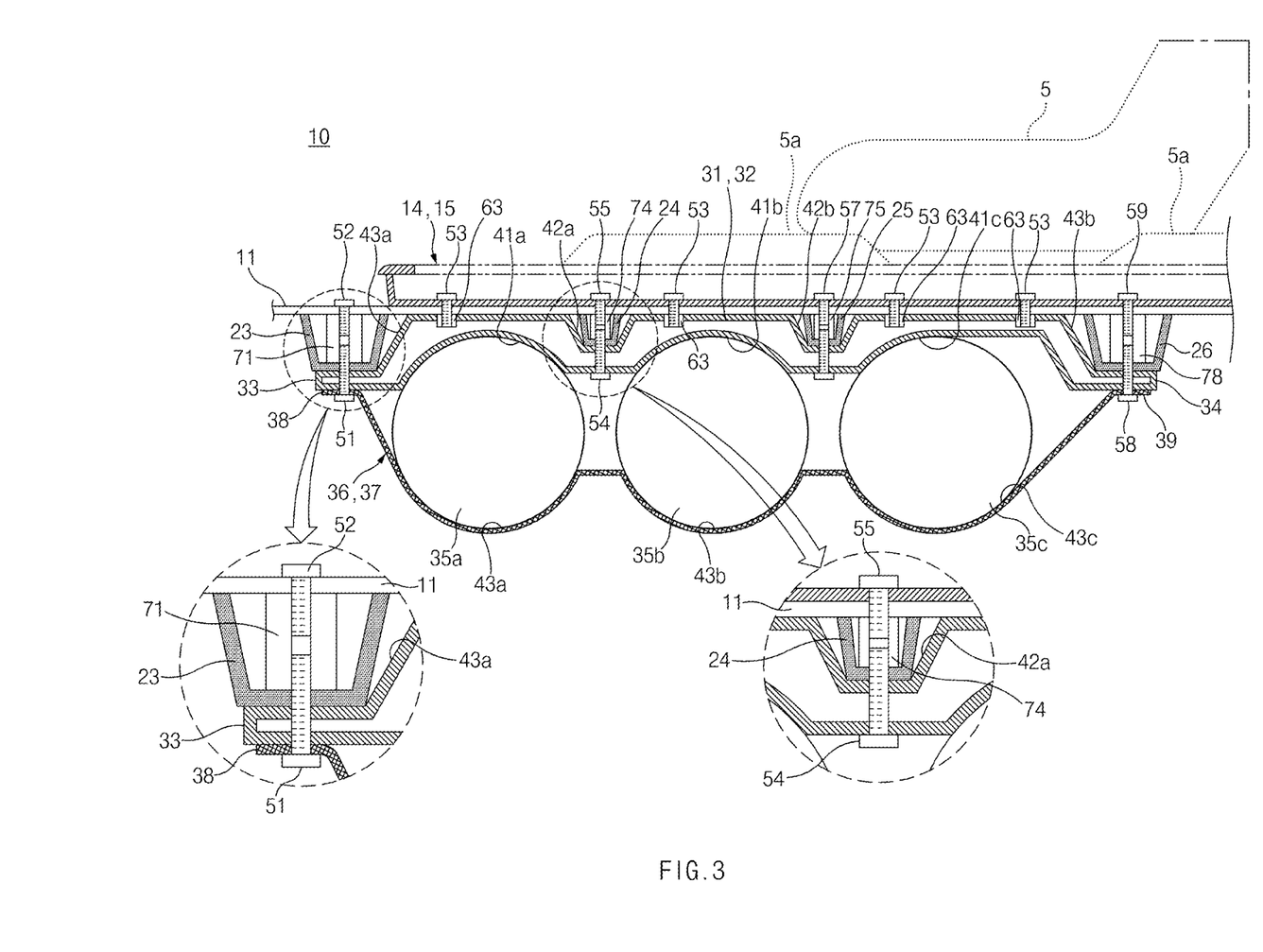
FIG. 3 illustrates a cross-sectional view of a modification to the exemplary embodiment of FIG. 2.

FIG. 3 illustrates a modification to the exemplary embodiment of FIG. 2.

Referring to FIG. 3, the front crossmember 23 may include a front nut 71 provided in the cavity thereof, and the front nut 71 may be fixed to the bottom portion of the front crossmember 23 by welding and/or the like. The first front bolt 51 and the second front bolt 52 may be screwed into the front nut 71. The first front bolt 51 may be screwed into lower internal threads of the front nut 71 through the front end portion 38 of each of the mounting bands 36 and 37, the front end portion 33 of each of the tank mounting members 31 and 32, and the bottom portion of the front crossmember 23 so that the front end portions 38 of the mounting bands 36 and 37 and the front end portions 33 of the tank mounting members 31 and 32 may be fixed together to the front crossmember 23. The second front bolt 52 may be screwed into upper internal threads of the front nut 71 through the floor 11 so that the front crossmember 23 may be fixed to the bottom surface of the floor 11. As the first front bolt 51 and the second front bolt 52 are screwed together into the front nut 71, the longitudinal axis of the first front bolt 51 may be precisely aligned with the longitudinal axis of the second front bolt 52. Thus, the front end portions 38 of the mounting bands 36 and 37, the front end portions 33 of the tank mounting members 31 and 32, and the front crossmember 23 may be securely fixed to the floor 11.

Referring to FIG. 3, the rear crossmember 26 may include a rear nut 78 provided in the cavity thereof, and the rear nut 78 may be fixed to the bottom portion of the rear crossmember 26 by welding and/or the like. The first rear bolt 58 and the second rear bolt 59 may be screwed into the rear nut 78. The first rear bolt 58 may be screwed into lower internal threads of the rear nut 78 through the rear end portion 39 of each of the mounting bands 36 and 37, the rear end portion 34 of each of the tank mounting members 31 and 32, and the bottom portion of the rear crossmember 26 so that the rear end portions 39 of the mounting bands 36 and 37 and the rear end portions 34 of the tank mounting members 31 and 32 may be fixed together to the rear crossmember 26. The second rear bolt 59 may be screwed into upper internal threads of the rear nut 78 through the floor 11 so that the rear crossmember 26 may be fixed to the bottom surface of the floor 11. As the first rear bolt 58 and the second rear bolt 59 are screwed together into the rear nut 78, the longitudinal axis of the first rear bolt 58 may be precisely aligned with the longitudinal axis of the second rear bolt 59. Thus, the rear end portions 39 of the mounting bands 36 and 37, the rear end portions 34 of the tank mounting members 31 and 32, and the rear crossmember 23 may be securely fixed to the floor 11.

Referring to FIG. 3, the middle crossmembers 24 and 25 may include middle nuts 74 and 75 provided in the cavities thereof, respectively, and the middle nuts 74 and 75 may be fixed to the bottom portion of the corresponding middle crossmembers 24 and 25 by welding and/or the like. The first middle bolts 54 and 56 and the second middle bolts 55 and 57 may be screwed into the corresponding middle nuts 74 and 75. The first middle bolts 54 and 56 may be screwed into lower internal threads of the corresponding middle nuts 74 and 75 through the bottom portion of the middle portions of the tank mounting members 31 and 32, respectively, so that the middle portions of the tank mounting members 31 and 32 may be fixed to the corresponding middle crossmembers 24 and 25. The second middle bolts 55 and 57 may be screwed into upper internal threads of the corresponding middle nuts 74 and 75 through the center slide rails 14 and 15 and the floor 11 so that the center slide rails 14 and 15 may be fixed to the floor 11 together with the middle crossmembers 24 and 25. As the first middle bolts 54 and 56 and the second middle bolts 55 and 57 are screwed together into the corresponding middle nuts 74 and 75, the longitudinal axis of each of the first middle bolts 54 and 56 may be aligned with the longitudinal axis of each of the corresponding second middle bolts 55 and 57. Thus, the center slide rails 14 and 15, the middle portions of the tank mounting members 31 and 32, and the plurality of middle crossmembers 24 and 25 may be securely fixed to the floor 11.

Figure 6:
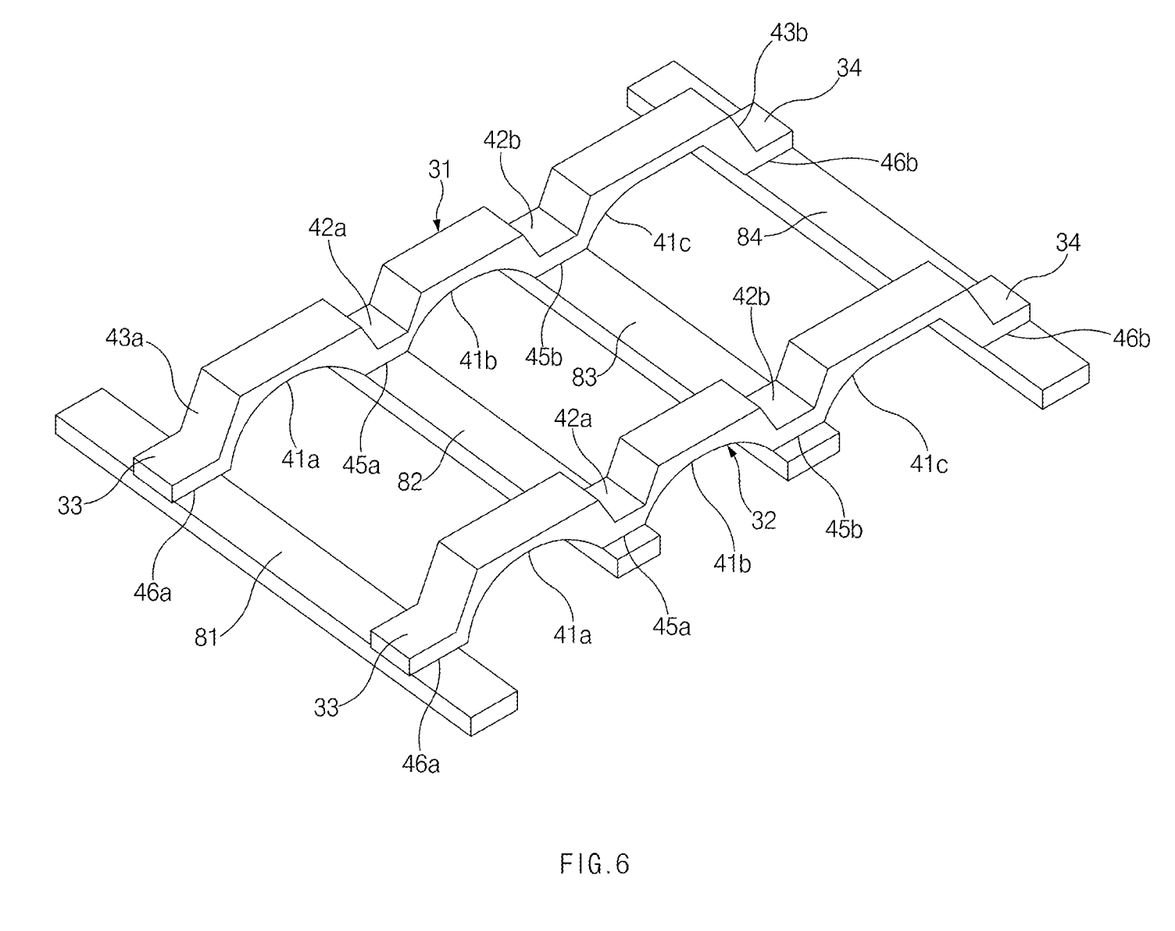
FIG. 6 illustrates a perspective view of a vehicle floor structure according to various exemplary embodiments of the present invention, in which a plurality of reinforcing crossmembers is attached between tank mounting members.
Figure 7:
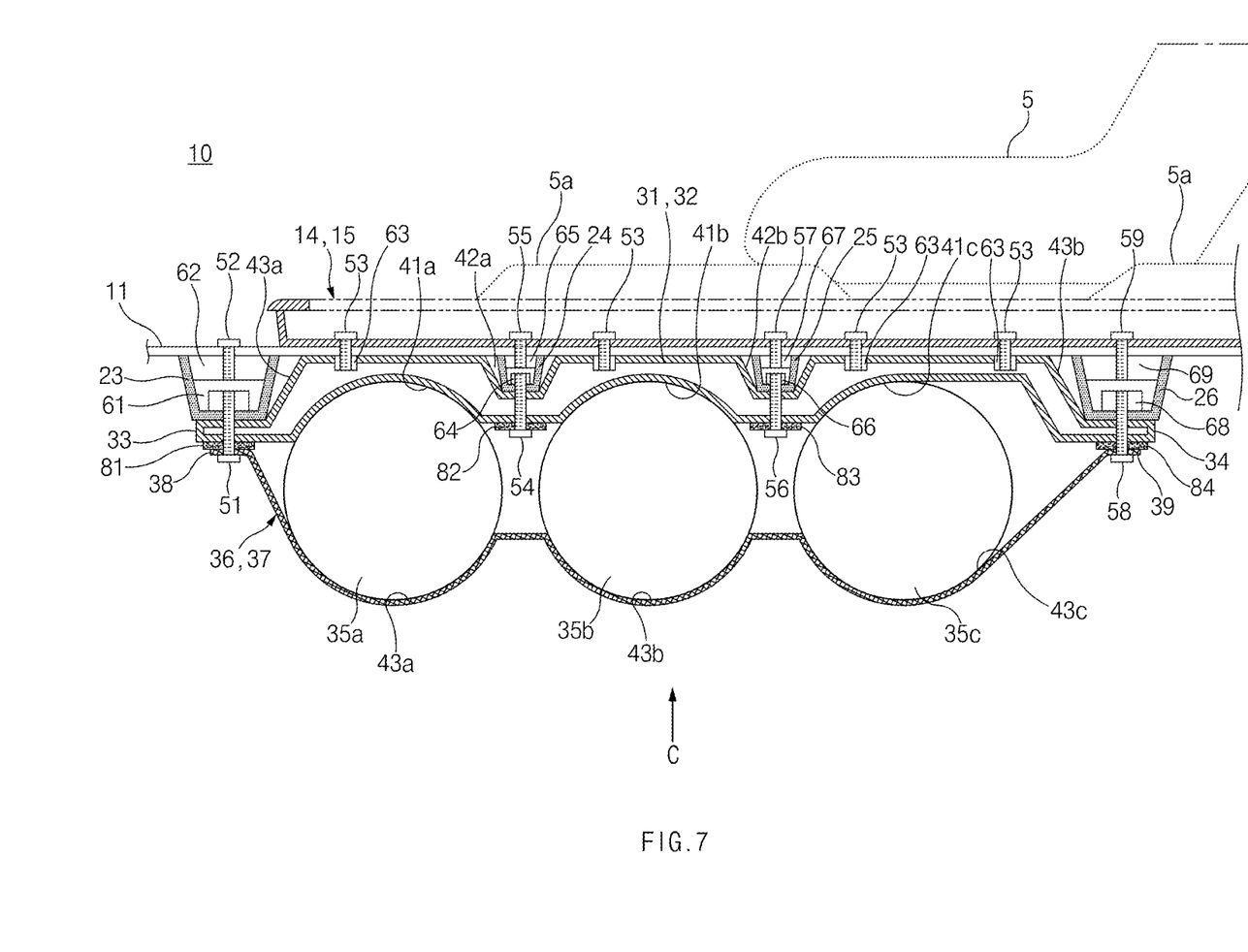
FIG. 7 illustrates a side sectional view of a vehicle floor structure according to various exemplary embodiments of the present invention.
Figure 8:
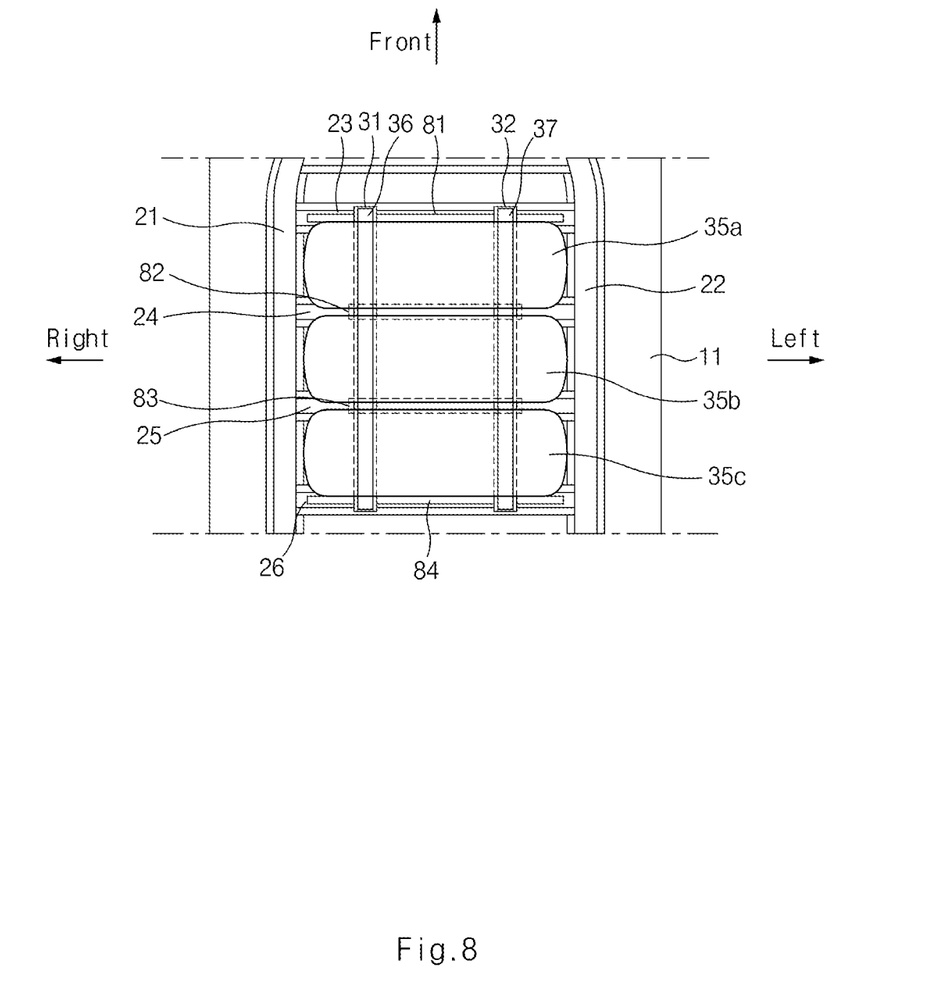
FIG. 8 illustrates a view which is viewed from a direction indicated by arrow C of FIG. 7.

Referring to FIGS. 6 to 8, the vehicle floor structure 10 according to various exemplary embodiments of the present invention may further include a plurality of reinforcing crossmembers 81, 82, 83, and 84 extending between the plurality of tank mounting members 31 and 32. Each of the reinforcing crossmembers 81, 82, 83, and 84 may extend in the width direction of the vehicle, and a longitudinal axis of each of the reinforcing crossmembers 81, 82, 83, and 84 may be parallel to the longitudinal axis of each of the hydrogen tanks 35a, 35b, and 35c. As the plurality of reinforcing crossmembers 81, 82, 83, and 84 connect the plurality of tank mounting members 31 and 32 in the width direction of the vehicle, stiffness of the plurality of tank mounting members 31 and 32 may be increased.

The plurality of reinforcing crossmembers 81, 82, 83, and 84 may include a front reinforcing crossmember 81 fixed to the front end portions 33 of the tank mounting members 31 and 32, a rear reinforcing crossmember 84 fixed to the rear end portions 34 of the tank mounting members 31 and 32, and a plurality of middle reinforcing crossmembers 82 and 83 fixed to the middle portions of the tank mounting members 31 and 32.

The front end portion 33 of each of the tank mounting members 31 and 32 may have a front mounting surface 46a provided on the bottom surface thereof, and the front mounting surface 46a may be a flat surface that matches a top surface of the front reinforcing crossmember 81. The front reinforcing crossmember 81 may be fixed to the front mounting surfaces 46*a* of the tank mounting members 31 and 32 so that the front reinforcing crossmember 81 may connect the front end portions 33 of the tank mounting members 31 and 32 in the width direction of the vehicle.

The rear end portion 34 of each of the tank mounting members 31 and 32 may have a rear mounting surface 46*b* provided on the bottom surface thereof, and the rear mounting surface 46*b* may be a flat surface that matches a top surface of the rear reinforcing crossmember 84. The rear reinforcing crossmember 84 may be fixed to the rear mounting surfaces 46*b* of the tank mounting members 31 and 32 so that the rear reinforcing crossmember 84 may connect the rear end portions 34 of the tank mounting members 31 and 32 in the width direction of the vehicle.

The tank mounting members 31 and 32 may have a plurality of middle mounting surfaces 45*a* and 45*b* positioned under the middle upper recessed portions 42*a* and 42*b*, respectively.

The middle reinforcing crossmembers 82 and 83 may be fixed to the middle mounting surfaces 45*a* and 45*b* of the tank mounting members 31 and 32, respectively, so that the plurality of middle reinforcing crossmembers 82 and 83 may connect the middle portions of the tank mounting members 31 and 32 in the width direction of the vehicle.

Referring to FIG. 7, the front reinforcing crossmember 81 may be fixed to the front crossmember 23 together with the front end portions 38 of the mounting bands 36 and 37 and the front end portions 33 of the tank mounting members 31 and 32 through the first front bolts 51. The front reinforcing crossmember 81 may be located between the front end portions 38 of the mounting bands 36 and 37 and the front end portions 33 of the tank mounting members 31 and 32. The rear reinforcing crossmember 84 may be fixed to the rear crossmember 26 together with the rear end portions 39 of the mounting bands 36 and 37 and the rear end portions 34 of the tank mounting members 31 and 32 through the first rear bolts 58. The rear reinforcing crossmember 84 may be located between the rear end portions 39 of the mounting bands 36 and 37 and the rear end portions 34 of the tank mounting members 31 and 32. The plurality of middle reinforcing crossmembers 82 and 83 may be fixed to the middle portions of the tank mounting members 31 and 32 through the plurality of first middle bolts 54 and 56, respectively. As the plurality of reinforcing crossmembers 81, 82, 83, and 84 are fixed to the floor 11 together with the plurality of tank mounting members 31 and 32, the plurality of mounting bands 36 and 37, and the plurality of crossmembers 23, 24, 25, and 26, the plurality of hydrogen tanks 35*a*, 35*b*, and 35*c* may be securely supported to the floor 11.

As set forth above, the vehicle floor structure according to exemplary embodiments of the present invention may provide the flat floor and the seat slide rails on the bottom portion of the vehicle by securely mounting the plurality of hydrogen tanks under the center floor, and thus internal quality of the vehicle may be improved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle floor structure of a vehicle, the vehicle floor structure comprising:
   a floor disposed on a bottom portion of a vehicle body;
   a plurality of tank mounting members attached to a bottom surface of the floor; and
   a plurality of hydrogen tanks mounted on the plurality of tank mounting members,
   wherein each tank mounting member is aligned to extend in a longitudinal direction of the vehicle,
   wherein the plurality of tank mounting members is spaced from each other in a width direction of the vehicle,
   wherein each tank mounting member has a plurality of lower recessed portions provided in a lower portion thereof, and
   wherein at least predetermined upper portions of the hydrogen tanks are received in the lower recessed portions of the tank mounting members, respectively.

2. The vehicle floor structure of claim 1,
   wherein each hydrogen tank has a cylindrical shape having a predetermined radius, and
   wherein each lower recessed portion has an arced shape having a same radius as a radius of each hydrogen tank.

3. The vehicle floor structure of claim 1,
   wherein each hydrogen tank is aligned to extend in the width direction of the vehicle, and
   wherein a longitudinal axis of each hydrogen tank is aligned to be parallel to a width axis of the vehicle.

4. The vehicle floor structure of claim 1,
   wherein the plurality of hydrogen tanks is mounted on the plurality of tank mounting members through a plurality of mounting bands,
   wherein the plurality of mounting bands is aligned with the plurality of tank mounting members,
   wherein each mounting band has a plurality of recesses, and
   wherein at least predetermined lower portions of the hydrogen tanks are accommodated in the recesses, respectively.

5. The vehicle floor structure of claim 4, further including:
   a frame attached to the bottom surface of the floor,
   wherein the frame includes a pair of side members disposed on first and second edge portions of the floor, respectively, and a plurality of crossmembers extending between the pair of side members, and
   wherein the plurality of tank mounting members is fixed to the plurality of crossmembers.

6. The vehicle floor structure of claim 5,
   wherein each tank mounting member has a plurality of upper recessed portions provided in an upper portion thereof, and
   wherein the plurality of upper recessed portions receives the plurality of crossmembers therein, respectively.

7. The vehicle floor structure of claim 5, wherein the plurality of crossmembers includes:
a front crossmember to which a front end portion of each of the tank mounting members is fixed;
a rear crossmember to which a rear end portion of each of the tank mounting members is fixed; and
a plurality of middle crossmembers disposed between the front crossmember and the rear crossmember.

8. The vehicle floor structure of claim 7,
wherein a front end portion of each of the mounting bands is fixed to the front crossmember together with the front end portion of each of the tank mounting members via a first front bolt, and
wherein the front crossmember is fixed to the bottom surface of the floor via a second front bolt.

9. The vehicle floor structure of claim 8,
wherein the front crossmember has a cavity defined therein,
wherein the front crossmember includes a first front nut and a second front nut provided in the cavity of the front crossmember,
wherein the first front nut is positioned below the second front nut in the cavity,
wherein the first front bolt is screwed into the first front nut through the front end portion of each of the mounting bands and the front end portion of each of the tank mounting members, and
wherein the second front bolt is screwed into the second front nut through the floor.

10. The vehicle floor structure of claim 8,
wherein the front crossmember has a cavity defined therein,
wherein the front crossmember includes a front nut provided in the cavity of the front crossmember,
wherein the first front bolt is screwed into lower internal threads of the front nut through the front end portion of each of the mounting bands and the front end portion of each of the tank mounting members, and
wherein the second front bolt is screwed into upper internal threads of the front nut through the floor.

11. The vehicle floor structure of claim 7,
wherein a rear end portion of each of the mounting bands is fixed to the rear crossmember together with the rear end portion of each of the tank mounting members via a first rear bolt, and
wherein the rear crossmember is fixed to the bottom surface of the floor via a second rear bolt.

12. The vehicle floor structure of claim 11,
wherein the rear crossmember has a cavity defined therein,
wherein the rear crossmember includes a first rear nut and a second rear nut provided in the cavity of the rear crossmember,
wherein the first rear nut is positioned below the second rear nut in the cavity of the rear crossmember,
wherein the first rear bolt is screwed into the first rear nut through the rear end portion of each of the mounting bands and the rear end portion of each of the tank mounting members, and
wherein the second rear bolt is screwed into the second rear nut through the floor.

13. The vehicle floor structure of claim 11,
wherein the rear crossmember has a cavity defined therein,
wherein the rear crossmember includes a rear nut provided in the cavity of the rear crossmember,
wherein the first rear bolt is screwed into lower internal threads of the rear nut, and
wherein the second rear bolt is screwed into upper internal threads of the rear nut.

14. The vehicle floor structure of claim 7,
wherein middle portions of the tank mounting members are fixed to the corresponding middle crossmembers through a plurality of first middle bolts.

15. The vehicle floor structure of claim 14, further including:
a plurality of center slide rails mounted on a top surface of the floor,
wherein each center slide rail is aligned to extend in the longitudinal direction of the vehicle,
wherein a longitudinal axis of each tank mounting member is aligned with a longitudinal axis of each center slide rail, and
wherein the center slide rails are fixed to the floor together with the tank mounting members through a plurality of second middle bolts.

16. The vehicle floor structure of claim 15,
wherein each middle crossmember has a cavity defined therein,
wherein each middle crossmember includes a first middle nut and a second middle nut provided in the cavity of each middle crossmember,
wherein the first middle nut is positioned below the second middle nut in the cavity of each middle crossmember,
wherein a corresponding first middle bolt is screwed into the first middle nut, and
wherein a corresponding second middle bolt is screwed into the second middle nut.

17. The vehicle floor structure of claim 15,
wherein each middle crossmember has a cavity defined therein,
wherein each middle crossmember includes a middle nut provided in the cavity of each middle crossmember,
wherein a corresponding first middle bolt is screwed into lower internal threads of the middle nut, and
wherein a corresponding second middle bolt is screwed into upper internal threads of the middle nut.

18. The vehicle floor structure of claim 15,
wherein the plurality of center slide rails is fixed to the floor together with the plurality of tank mounting members via a plurality of upper bolts,
wherein each of the tank mounting members includes a plurality of upper nuts embedded therein, and
wherein the plurality of upper bolts is screwed into the plurality of upper nuts.

19. The vehicle floor structure of claim 1, further including:
a plurality of reinforcing crossmembers extending between the plurality of tank mounting members,
wherein a longitudinal axis of each reinforcing crossmember is aligned to be parallel to a longitudinal axis of each hydrogen tank.

20. The vehicle floor structure of claim 19,
wherein the plurality of reinforcing crossmembers is fixed to the floor together with the plurality of tank mounting members.

* * * * *